United States Patent [19]

Chambers et al.

[11] 4,379,686

[45] Apr. 12, 1983

[54] APPARATUS FOR MOLDING A RECORDED DISC

[75] Inventors: Robert W. Chambers, Willingboro, N.J.; Michael L. McNeely; Leslie A. Torrington, both of Indianapolis, Ind.

[73] Assignee: RCA Corporation, New York, N.Y.

[21] Appl. No.: 352,000

[22] Filed: Feb. 24, 1982

Related U.S. Application Data

[60] Division of Ser. No. 187,161, Sep. 15, 1980, which is a continuation-in-part of Ser. No. 146,379, May 5, 1980, abandoned.

[51] Int. Cl.³ ............................................. B29D 17/00
[52] U.S. Cl. .................................. 425/290; 425/810; 264/107; 264/155; 264/163
[58] Field of Search ................ 425/290, 810; 264/107, 264/155, 163

[56] References Cited

U.S. PATENT DOCUMENTS

| | | | |
|---|---|---|---|
| 941,291 | 11/1909 | Wickes | 425/810 |
| 1,372,992 | 3/1921 | Beadle | 369/272 |
| 1,442,856 | 1/1923 | Christensen | 425/810 |
| 2,853,737 | 9/1958 | Harlow | 18/5.3 |
| 3,662,051 | 5/1972 | Harlow et al. | 264/107 |
| 3,671,158 | 3/1970 | Rand et al. | 425/129 |
| 3,989,436 | 11/1976 | McNeely et al. | 425/242 |
| 4,334,849 | 6/1982 | Bock | 264/155 X |

FOREIGN PATENT DOCUMENTS 1367680  9/1974  United Kingdom ............... 425/810

Primary Examiner—Thomas P. Pavelko
Attorney, Agent, or Firm—Birgit E. Morris; Donald S. Cohen

[57] ABSTRACT

A molding apparatus for molding a recorded disc includes a pair of mold plates adapted to form a mold cavity therein and a center hole forming pin slidably mounted in one of the mold plates. The center hole forming pin is larger in diameter than the hole to be formed and has a projection on its end which is of a diameter equal to the hole to be formed and a length about one-half the length of the hole to be formed. The other mold plate includes a projection extending therefrom of a diameter equal to the diameter of the hole to be formed and a length one-half the length of the hole. In the molding of the disc the projection on the center hole forming pin engages the projection on the other mold plate to form a hole in which a flash is spaced from the edges of the hole.

7 Claims, 6 Drawing Figures

APPARATUS FOR MOLDING A RECORDED DISC

BACKGROUND OF THE INVENTION

This is a division of our application Ser. No. 187,161, filed Sept. 15, 1980, entitled "APPARATUS FOR MOLDING A RECORDED DISC" which is a continuation-in-part of our application Ser. No. 146,379, filed May 5, 1980, entitled "APPARATUS FOR MOLDING A RECORDED DISC" and now abandoned.

The present invention relates to an apparatus for molding a recorded disc and particularly to such an apparatus which places the flash around the center hole of the disc so that it does not interfere with the proper playing of the disc.

A high packing density recorded disc, such as a video disc, in which the packing density is in the order of 10,000 grooves per inch (3,937 per cm), has grooves which are much finer in dimension than an audio recorded disc and rotates at much higher speed. The grooves in a high packing density disc are about 2.7 microns in width, as compared to 50–60 microns for an audio disc, and are in the order of 4,000 Angstroms in depth. Also, the high packing density disc rotates at about 450 rpm as compared to 33 rpm for an audio disc. Because of the fine dimensions of the groove and the high speed of rotation of the disc, the disc must be stably supported to insure proper tracking of the stylus in the groove. To help achieve this stability, the disc is provided with a relatively large center hole, about 1.3 inches (3.3 cm) in diameter and is seated in the player on a truncated conical spindle.

A method generally used to make the disc is compression molding. It has been found desirable to form the center hole in the disc as it is being molded. An apparatus suitable for forming the center hole in the disc as it is being molded is shown and described in copending application for U.S. Letters Patent of Michael Lee McNeely, Ser. No. 093,012, filed Nov. 9, 1979, "METHOD AND APPARATUS FOR PRODUCING DISC RECORDS HAVING MOLDED-IN CENTER HOLES", which is incorporated herein by reference. A problem with this apparatus is that is leaves the record with flash about the center hole of the record at both of the surfaces of the record. At one surface the flash projects radially inwardly from the edge of the center hole and at the other surface the flash projects normal to the other surface from along the edge of the center hole. Thus, no matter which way the disc is mounted on the spindle, the surface of the spindle will contact the flash so as to interfere with the proper seating of the disc on the spindle. Thus, the flash can result in unstable support of the disc during the playing of the disc.

SUMMARY OF THE INVENTION

An apparatus for molding a recorded disc includes a pair of mold plates adapted to form therebetween a disc mold cavity, and a center hole forming pin movable in one of the mold plates toward and away from the other mold plate at the center of the mold cavity. The center hole forming pin is larger in diameter than the hole to be formed and has a cylindrical projection extending from its end surface which is of the diameter of the hole to be formed. The projection is of a length such that when the end of the projection mates with the other mold plate to form the hole in the disc, the end surface of the pin around the projection forms an extension of the surface of the mold cavity.

DETAILED DESCRIPTION

Figure 1:
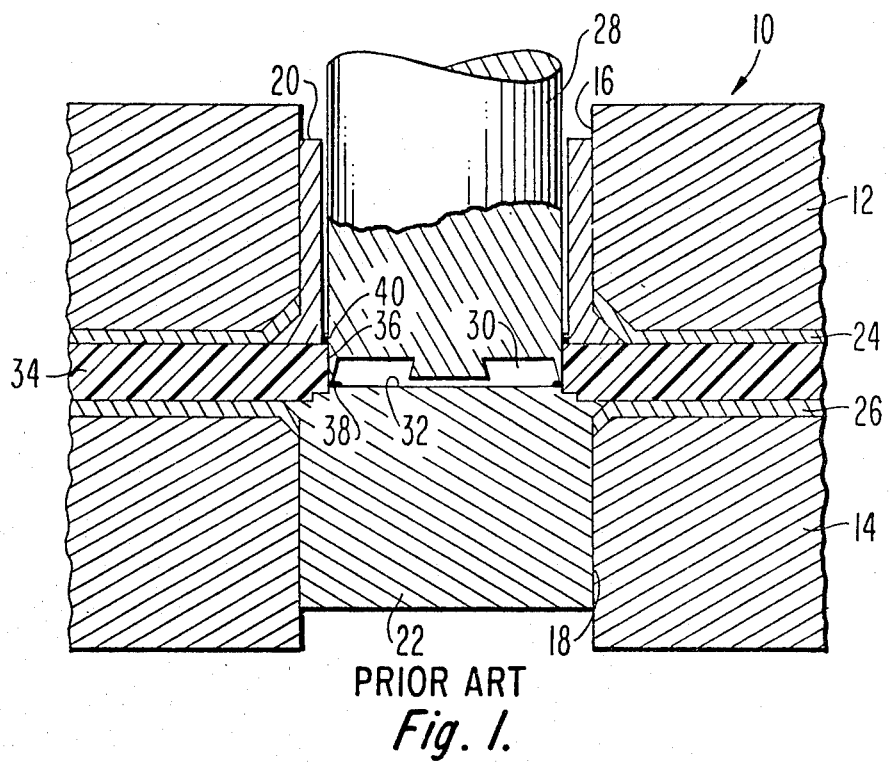
FIG. 1 is a sectional view of a portion of a mold press having a center hole forming pin of the prior art.

Referring to FIG. 1, a recorded disc molding press of the prior art, which is described in detail in the previously mentioned copending application Serial No. 093,012, is generally designated as 10. In general, the molding press 10 includes upper and lower mold plates 12 and 14 which are mounted so that at least one of them is movable toward and away from the other. The mold plates 12 and 14 have aligned center openings 16 and 18 respectively therethrough in which are mounted center plates 20 and 22 respectively. Stampers 24 and 26 are mounted on the opposed surfaces of the mold plates 12 and 14 respectively. The stampers 24 and 26 are thin metal plates having on the surface thereof the negative of the impression to be applied to the surface of the molded record. The stampers 24 and 26 are secured to the mold plates 12 and 14 by the center plates 20 and 22 respectively.

A center hole forming pin 28 extends through and is slidable in the center plate 20 of the upper mold plate 12. The center hole forming pin 28 is cylindrical and has an outer diameter corresponding to the desired diameter for the hole in the recorded disc. The pin 28 has a recess 30 in its end surface which faces the bottom center plate 22. The top surface 32 of the lower center plate 22 may be completely flat or, as shown, may have a raised portion to assist in forming the center hole in the molded disc.

To make a record in the mold press 10, the mold plates 12 and 14 are separated (i.e. opened) and a preform of the plastic material desired for the record is placed between the mold plates. The mold plates 12 and 14, which are heated, are then moved toward each other, (i.e. closed) and contact the preform to cause the material of the preform to flow radially outwardly between the stampers 24 and 26. The mold plates 12 and 14 are closed until they form a mold cavity of the size of the desired recorded disc 34. As the mold plates 12 and 14 are closing, the center hole forming pin 28 is advanced through the preform to push out the plastic material from the center hole area. The center hole forming pin 28 is advanced until it contacts the top surface 32 of the lower center plate 22. Thus, there is formed in the mold cavity between the stampers 24 and 26 the molded disc 34 having a hole 36 through the center thereof.

Figure 2A:
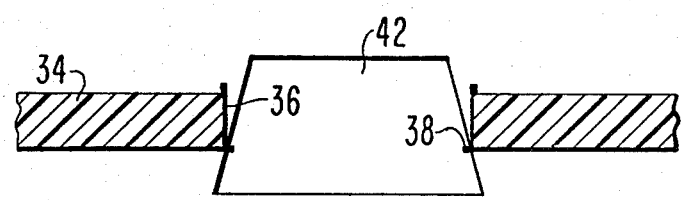
FIGS. 2A and 2B are sectional views showing a recorded disc made in the press shown in FIG. 1 seated on a player spindle.
Figure 2B:
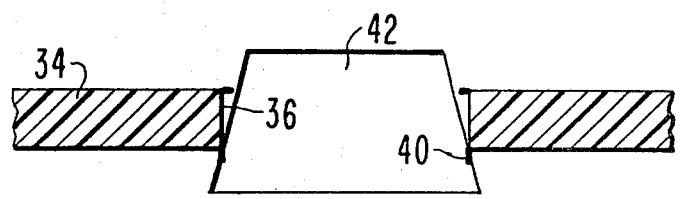

During the molding of the recorded disc 34, some of the plastic material is trapped between the end of the center hole forming pin 28 and the top surface 32 of the lower center plate 22 forming a thin ring of flash 38 extending radially inwardly from the surface of the hole 36 at one surface of the disc 34. Some of the plastic material also seeps between the center hole forming pin 28 and the upper center plate 20 forming a short cylinder of flash 40 projecting upwardly from the edge of the hole 36 at the other surface of the disc 34. When the recorded disc 34 is seated on the truncated conical spindle 42 of a record player, as shown in FIG. 2A, the flash 38 will contact the surface of the spindle 42 and can cause improper seating of the disc 34 on the spindle 42. When the recorded disc 34 is turned over and seated on the spindle 42, as shown in FIG. 2B, the flash 40 will contact the surface of the spindle and can cause improper seating of the recorded disc on the spindle. Thus, the flash at the center hole 36 of the recorded disc 34 can interfere with the proper playing of the recorded disc.

Figure 3:
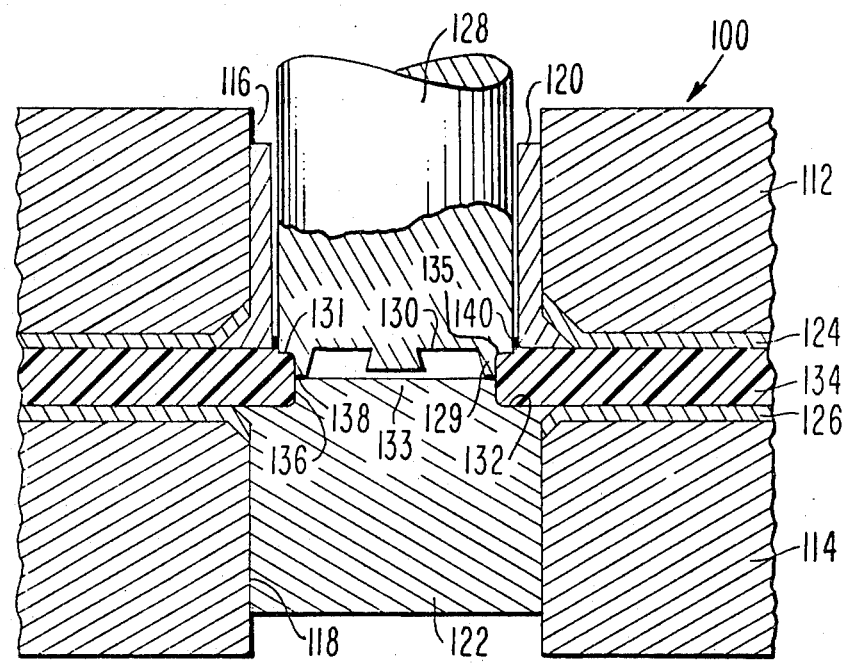
FIG. 3 is a sectional view of a portion of a molding press having the center hole forming pin of the present invention.

Referring to FIG. 3, the disc molding press of the present invention is generally designated as 100. The molding press 100, like the molding press 10 shown in FIG. 1, includes upper and lower mold plates 112 and 114 having aligned center openings 116 and 118 respectively therethrough in which are mounted center plates 120 and 122 respectively. Stampers 124 and 126 are mounted on the opposed surfaces of the mold plates 112 and 114 respectively. The stampers 124 and 126 are secured to the mold plates 112 and 114 by the center plates 120 and 122 respectively.

A center hole forming pin 128 extends through and is slidable in the center plate 120 of the upper mold plate 112. The center hole forming pin 128 is cylindrical and has an outer diameter slightly larger than the diameter of the hole to be formed in the recorded disc. The pin 128 has a cylindrical projection 129 extending from its end surface 131 which faces the lower center plate 122. The projection 129 has an outer diameter corresponding to the desired diameter for the hole in the recorded disc and is of a length approximately but preferably slightly less than one-half the thickness of the recorded disc. The projection 129 has a recess 130 in its end corresponding to the recess 30 in the center hole forming pin 28 of the mold press 10 shown in FIG. 1. The lower center plate 122 has a cylindrical projection 133 extending from the center of the top surface 132 thereof. The projection 133 is of a diameter corresponding to the diameter of the hole to be formed in the recorded disc and of a length equal to one-half the thickness of the disc.

A recorded disc 134 is made in the mold press 100 in the same manner as previously described with regard to the mold press 10 shown in FIG. 1. However, when the center hole forming pin 128 is extended through the plastic material to form the center hole 136 in the disc 134, the projections 129 and 133 of the pin 128 and lower center plate 122 respectively meet at a point substantially midway along the length of the hole 136. Also, the end surface 131 of the pin 128 and the top surface 132 of the lower center plate 122 are then substantially aligned with the upper and lower stampers 124 and 126 respectively so that, along with the outer surfaces of the projections 129 and 133, they form an extension of the mold cavity. Since the projections 129 and 133 meet midway along the length of the hole 136 in the disc 134, the flash 138 which may form between the projections 129 and 133 extends radially inwardly from the surface of the hole 136 midway along the length of the hole. Also, the flash 140 which may form between the center hole forming pin 128 and the upper center plate 120 projects from the surface of the disc 134 at a point spaced outwardly away from the edge of the hole 136. By having the length of the projection 129 of the center hole pin 128 slightly less than one-half the thickness of the recorded disc, the end surface 131 will press slightly into the surface of the disc to form a recess 135 around the center hole 136. This insures that the flash 140 is formed at a point spaced outwardly from the edge of the hole 136.

Figure 4A:
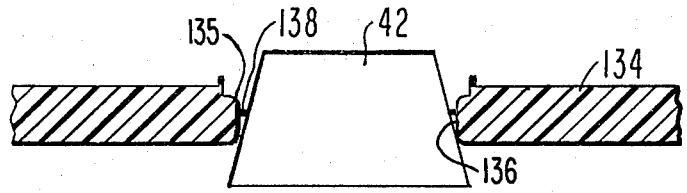
FIGS. 4A and 4B are sectional views showing a record made in the molding press shown in FIG. 3 mounted on a player spindle.
Figure 4B:
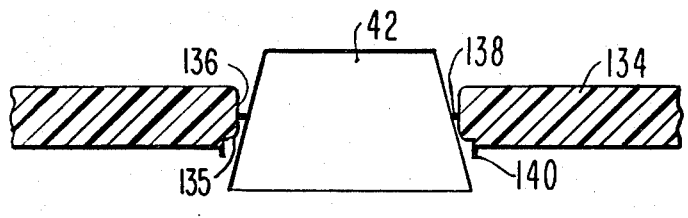

When the recorded disc 134 is mounted on the spindle 42 of the disc player, as shown in FIG. 4A, the flash 138 projecting from the surface of the opening 136 is spaced from the surface of the spindle so that it does not interfere with the seating of the disc on the spindle. Likewise, when the disc 134 is turned over and mounted on the spindle 42 as shown in FIG. 4B, both the flash 138 projecting from the surface of the opening 136 and the flash 140 projecting from the surface of the disc 134 are spaced from the spindle so that neither interferes with the proper seating of the disc on the spindle. Thus, the recorded disc molding press of the present invention forms a disc in which any flash at or adjacent the center hole of the disc is positioned so that the flash does not interfere with the proper seating of the disc on the player spindle.

We claim:

1. In an apparatus for molding a recorded disc which includes a pair of mold plates adapted to form therebetween a disc mold cavity, and a center hole forming pin movable in one of the mold plates toward and away from the other mold plate at the center of the mold cavity, the improvement comprising:
said center hole forming pin being larger in diameter than the hole to be formed and having a cylindrical projection extending from its end surface which is of the diameter of the hole to be formed, the projection being of a length such that when the end of the projection mates with the other mold plate to form the hole in the disc, the end surface of the pin around the projection forms an extension of a surface of the mold cavity.

2. A molding apparatus in accordance with claim 1 in which the projection on the center hole forming pin meets the surface of the other mold plate at a position between the sides of the mold cavity.

3. A molding apparatus in accordance with claim 2 in which the surface of the other mold plate which is met by the end of the projection on the center hole forming pin is on the end of a projection which extends into the cavity from the other mold plate.

4. A molding apparatus in accordance with claim 3 in which the other mold plate has a center plate mounted in the center of the other mold plate and the center plate has a projection extending therefrom of a diameter equal to the diameter of the hole to be formed in the record and the projection on the center hole forming pin meets with the end of the projection on the center plate.

5. A molding apparatus in accordance with claim 4 in which each of the projections on the center hole forming pin and the center plate are of a length substantially one-half the length of the hole to be formed.

6. A molding apparatus in accordance with claim 5 in which the length of the projection on the center hole pin is slightly less than one-half the length of the hole to be formed.

7. A molding apparatus in accordance with claim 6 in which the one mold plate has a center plate in the center thereof and the center hole forming pin is slidably mounted in said center plate.

* * * * *